US009422917B2

(12) United States Patent
Hammerum et al.

(10) Patent No.: US 9,422,917 B2
(45) Date of Patent: Aug. 23, 2016

(54) SAFETY SYSTEM FOR A WIND TURBINE

(75) Inventors: Keld Hammerum, Hadsten (DK);
Morten Thøgersen, Hinnerup (DK)

(73) Assignee: Vestas Wind Systems A/S, Aarhus N (DK)

(*) Notice: Subject to any disclaimer, the term of this patent is extended or adjusted under 35 U.S.C. 154(b) by 122 days.

(21) Appl. No.: 14/001,481

(22) PCT Filed: Feb. 21, 2012

(86) PCT No.: PCT/DK2012/050058
§ 371 (c)(1),
(2), (4) Date: Sep. 27, 2013

(87) PCT Pub. No.: WO2012/113403
PCT Pub. Date: Aug. 30, 2012

(65) Prior Publication Data
US 2014/0015251 A1    Jan. 16, 2014

Related U.S. Application Data

(60) Provisional application No. 61/446,165, filed on Feb. 24, 2011.

(30) Foreign Application Priority Data

Feb. 24, 2011    (DK) .................. 2011 70100

(51) Int. Cl.
*F03D 7/00* (2006.01)
*F03D 7/02* (2006.01)
*F03D 11/00* (2006.01)

(52) U.S. Cl.
CPC ............. *F03D 7/00* (2013.01); *F03D 7/0264* (2013.01); *F03D 7/0268* (2013.01); *F03D 7/0276* (2013.01); *F03D 7/0288* (2013.01); *F03D 7/0296* (2013.01); *F03D 11/0025* (2013.01);
(Continued)

(58) Field of Classification Search
CPC ... F03D 7/0264; F03D 7/0268; F03D 7/0276; F03D 7/0288; F03D 7/0296; F03D 11/0091; F03D 7/00; Y02E 10/723
USPC ..................................................... 290/44, 55
See application file for complete search history.

(56) References Cited

U.S. PATENT DOCUMENTS

2004/0201220 A1* 10/2004 Andersen et al. ............... 290/44
2007/0018457 A1*  1/2007 Llorente Gonzalez ......... 290/44
(Continued)

FOREIGN PATENT DOCUMENTS

DE      19528862 A1    2/1997
DE    102005034899 A1    2/2007
(Continued)

OTHER PUBLICATIONS

International Search Report; PCT/DK2012/050058; Jul. 4, 2012.

*Primary Examiner* — Tulsidas C Patel
*Assistant Examiner* — Viet Nguyen
(74) *Attorney, Agent, or Firm* — Patterson + Sheridan, LLP

(57) ABSTRACT

The invention provides a safety system for a wind turbine comprising a tower with a nacelle, and a rotor with blades and a connected drive train. The safety system comprises at least one load sensing system for providing a load signal significant for a load on the tower or rotor, and an electronic system which based on the load signal brings the wind turbine to a safe condition.

20 Claims, 1 Drawing Sheet

(52) U.S. Cl.
CPC ........ *F03D 11/0033* (2013.01); *F03D 11/0091* (2013.01); *F05B 2260/80* (2013.01); *Y02E 10/722* (2013.01); *Y02E 10/723* (2013.01)

(56) References Cited

U.S. PATENT DOCUMENTS

| | | | | |
|---|---|---|---|---|
| 2008/0118342 | A1* | 5/2008 | Seidel | F03D 7/0224 415/1 |
| 2008/0290664 | A1* | 11/2008 | Kruger | 290/55 |
| 2009/0148286 | A1* | 6/2009 | Kammer et al. | 416/31 |
| 2009/0243295 | A1* | 10/2009 | Kammer et al. | 290/44 |
| 2010/0052321 | A1* | 3/2010 | Bilges et al. | 290/44 |
| 2010/0283246 | A1* | 11/2010 | Christensen | 290/44 |
| 2012/0137171 | A1* | 5/2012 | Zalman et al. | 714/10 |
| 2012/0292905 | A1* | 11/2012 | Slot | 290/44 |
| 2013/0110414 | A1* | 5/2013 | Caponetti et al. | 702/35 |
| 2013/0129508 | A1* | 5/2013 | Spruce | 416/1 |

FOREIGN PATENT DOCUMENTS

| | | |
|---|---|---|
| EP | 2159418 A2 | 3/2010 |
| WO | 2009043352 A2 | 4/2009 |
| WO | WO 2011092032 A1 * | 8/2011 |

* cited by examiner

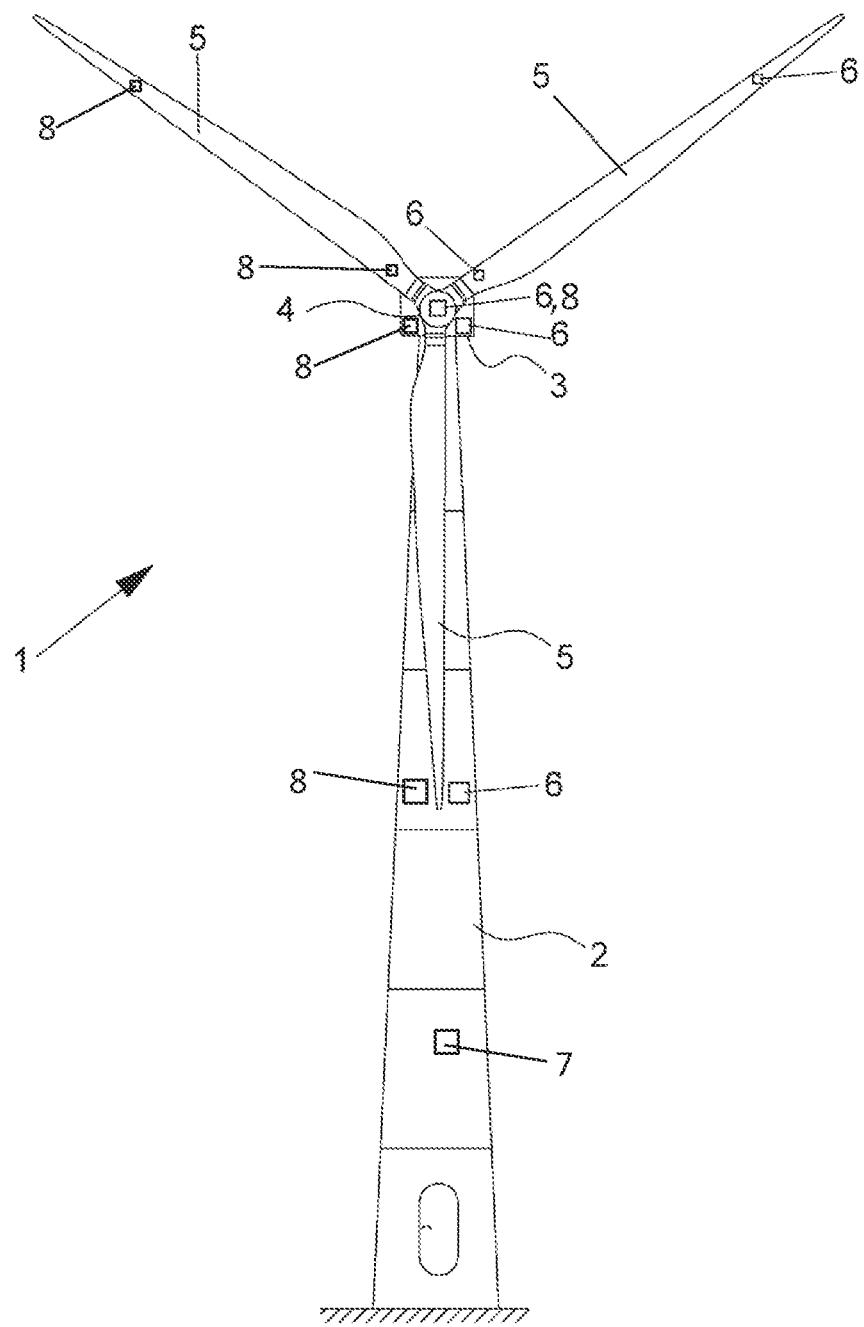

SAFETY SYSTEM FOR A WIND TURBINE

FIELD OF THE INVENTION

The present invention relates to a safety system for a wind turbine and a wind turbine comprising a safety system.

BACKGROUND OF THE INVENTION

Most modern wind turbines are controlled and regulated continuously most often with the purpose of ensuring maximum power extraction from the wind under the current wind, and weather, while at the same time ensuring that the loads on the different components of the wind turbine are at any time kept within acceptable limits. Desirably, the wind turbine may also be controlled to account for fast sudden changes in the wind velocity—the so-called wind gusts, and take into account the dynamic changes in the loads on the individual blades due to e.g. the passing of the tower, or the actual wind velocity varying with the distance to the ground (the wind profile or shear).

To this purpose a number of parameters are collected and monitored by the controllers in a wind turbine, such as for instance the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The current performance, and thereby the power production and the load situation of the wind turbine is primarily controlled by controlling the pitch angles of the blades, but may further include adjusting for instance any different active aerodynamic devices for changing the aerodynamic surfaces of the blades such as flaps or vortex generating means, adjusting the power, and/or adjusting the rotational speed of the rotor.

Wind turbines are traditionally constructed and controlled according to standards and according to wind maps and incorporating the trade-off of maximizing the annual energy production by the wind turbine while on the same time ensuring a certain life time of the turbine i.e. keeping the loads on the different components of the wind turbine within acceptable limits at all times and over time. Wind turbines are therefore typically designed according to a certain (high) turbulence but will most often be operating at a lower turbulence level and may in some conditions be controlled too conservative, while in some conditions not conservative enough resulting in undesired fatigue or extreme loads on the wind turbine components, especially the blades, nacelle and tower.

Traditional wind turbines are designed for a specific maximum load, e.g. calculated from a specific wind speed at which the wind turbine is stopped. The tower, nacelle, blades and other structures of the wind turbine are designed for this maximum load which means that the structures are sufficiently strong with regard to this maximum wind speed—calculated with a safety margin.

This typically requires increased reinforcement of the heavy turbine parts such as the tower, and the result is increased costs related to manufacturing, handing, maintenance, inspection etc.

SUMMARY OF THE INVENTION

It is an object of the present invention to provide a safety system for a wind turbine and to provide an improved wind turbine comprising a safety system.

Thus, in a first aspect, the invention provides a safety system for a wind turbine comprising a tower with a nacelle, and a rotor with blades and a connected drive train, the safety system comprising at least one load sensing system for providing a load signal significant for a load on the tower or rotor, and an electronic system which based on the load signal brings the wind turbine to a safe condition.

Since the safety system according to the invention brings the wind turbine to a safe condition based on actually measured load signals and not based on a maximum wind speed or similar predetermined limiting weather conditions, the system according to the invention is capable of ensuring a better match between the actual loads and when to bring the turbine to a safe condition. The risk of overloading of the turbine is thereby reduced, and the heavy components of the turbine may therefore be designed with a smaller safety margin. Accordingly, the invention provides a safer and/or more cost efficient turbine.

It should be understood that by bringing the wind turbine to a safe condition is meant, that the rotor speed is lowered to a speed which is less than half the nominal speed.

The safe condition may comprise a condition where the wind turbine is brought to a standstill. Alternatively, the safe condition may comprise a condition where the wind turbine is brought to an idle mode. The safe condition may dependent on the load signal provided.

In one embodiment, the electronic system comprises load data describing a critical load condition and bringing the wind turbine to a safe condition may thus be based on a comparison between the provided load signal and the load data. As an example, the load data may comprise critical loads for the tower, such as a load at which the tower may bend too much or may actually break. Bringing the wind turbine to a safe condition may thus be initiated when the load signal is e.g. 70% or more of the load data. Other ratios may be used for the comparison dependent of the load data used.

The load data may also comprises critical loads for the blades, such as a load at which bending of the blades is so high that they may hit the tower or a load at which they may break. Consequently, bringing the wind turbine to a safe condition may also be initiated when the load signal is at a certain percentage of one of these blade loads. The percentage may e.g. depend on the size of the wind turbine and thus the size of the blades.

In order to control of the situation at which the wind turbine is brought to a safe condition dependent on the actual load situation for the wind turbine, the electronic system may receive load signals from the load sensing system while initiating the safe condition. Thereby, is may be ensured that bringing the wind turbine to a safe condition is carried out as requested. Furthermore, is may be controlled that a critical load does not arise at another part of the wind turbine while the wind turbine is at the safe condition.

The load signal may be significant for torsion or bending of the tower or rotor. As an example, the load signal may be signification for bending of the tower or significant for the nacelle to break off the tower. Likewise, the load signal may be significant for bending of at least one of the blades, such as significant for the load at which the at least one blade may break or the load at which the at least one blade may hit the tower during rotation.

As critical loads may arise from different load situations, the load sensing system may be capable of detecting load caused by at least one of ice formation on the rotor, mass unbalance, de-lamination, lightning, and excessive rotor speed. In one embodiment, different load sensing systems may be provided for different load situations. Each of the load sensing systems may thus provide a load signal significant for an associated load.

Additional to the load signals, the safety system may further be adapted to bring the wind turbine to a safe condition based on weather conditions, such as wind speed, wind direction, pressure, temperature, rainfall, fog, etc. This may especially be an advantage in relation to load situations which may be increased during certain weather conditions. As an example, it may be an advantage to bring the wind turbine to a safe condition at a higher speed based on a load signal significant for ice formation on the rotor if the air temperature is below a certain predefined temperature. Similarly, it may be an advantage to faster bring the wind turbine to a safe condition based on excessive rotor speed if the wind speed is above a certain predefined wind speed.

As it is of great importance that failures are minimized or even avoided, the safety system may further comprise a validation sensor providing additional load data. The additional data may be collected in parallel to the load signal. The electronic system may be capable of validating the load signal based on a comparison between the load signal and the additional load data, thereby providing an indication of a failure in case the difference between the load signal and the additional load data is too high.

The safety system may further be adapted to bring the wind turbine to a safe condition if the difference between the load signal and the load data is above a pre-defined validation value. The pre-defined value may depend on the load sensing system in use. A number of pre-defined validation values may be used in the safety system so that e.g. a pre-defined validation value exists for each sensing system.

The pre-defined validation value may be variable, e.g. so that it depends on weather conditions and/or the time of the day.

Furthermore, validation of the load signal may be a model-based validation which is not limited to measurements of loads. Instead, the model-based validation may be based on weather data.

Additionally, validation of the load signal may be done based on another load signal. As an example, a load signal significant for bending of the tower may be validated by use of a load signal significant for tower top acceleration.

Dependent on the position used for the at least one load sensing system, different sensor may be used. Thus, the at least one load sensing system may be selected from a group consisting of: electrical sensors, optical sensors, acoustic sensor, GPS based sensors, accelerometers, gyro sensors, and Teraherz based sensors. It should however be understood, that more that one sensing system may be applied and that the selected sensors may be different or may be of the same type.

In one embodiment, the load sensing system may be positioned on at least one of the wind turbine blades, whereby the load sensing system may be responsible for providing load data, e.g. in the form of bending of the blade and/or rotational speed of the blade. A load sensing system positioned at the tower may be responsible for providing load data, e.g. in the form of bending of the tower and/or vibrations of the tower. Thus, a number of different and/or identical sensing systems may be used, each providing a load signal significant for a certain load. By increasing the number of sensing systems with identical or different failure modes it may be possible to increase reliability of the safety system.

In one embodiment, the load sensing system may be a single-channel sensor with a probability of dangerous failure per hour (PFH) of at most $10^{-6}$, and a safe failure fraction above 90%.

As an alternative, the load sensing system may be a dual-channel system with a probability of dangerous failure per hour (PFH) of at most $10^{-6}$, and a safe failure fraction above 60%.

In a second aspect, the invention provides a wind turbine comprising a safety system according to the first aspect of the invention.

It should be understood, that the above-mentioned features of the first aspect of the invention may also be applicable in relation to the wind turbine according to the second aspect of the invention. Thus, the second aspect may comprise any combination of features and elements of the first aspect of the invention.

BRIEF DESCRIPTION OF THE DRAWINGS

Embodiments of the invention will now be further described with reference to the drawings, in which:

FIG. 1 illustrates different load sensing systems positioned at different locations of a wind turbine.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

FIG. 1 illustrates a wind turbine 1 comprising a tower 2 with a nacelle 3 at the top of the tower. The nacelle 3 houses machine components, such as gearbox, generator etc. (not shown). At one end of the nacelle 3, a hub section 4 supports a three wind turbine blades 5. The rotor of the wind turbine 1 includes the blades 5 and possibly other rotating parts.

The wind turbine 1 further comprises a safety system. The safety system comprises a number of load sensing systems 6 for providing a load signal significant for a load on the tower 2 or rotor. Furthermore, the safety system comprises an electronic system 7 which based on the load signal brings the wind turbine 1 to a safe condition.

As an example, the load signals are significant for an acceleration of a component of the wind turbine 1, a load of a component of the wind turbine 1, bending of a component of the wind turbine, e.g. the tower or a blade, a load caused by ice formation on the rotor, mass unbalance, de-lamination, lightning, excessive rotor speed, etc.

Furthermore, the load signal may be significant for torque measured at the hub or stress in a blade root.

As it is of great importance that failures are minimized or even avoided, the safety system may further comprise a validation sensor 8 providing additional load data. The additional data may be collected in parallel to the load signal. The electronic system may be capable of validating the load signal based on a comparison between the load signal and the additional load data, thereby providing an indication of a failure in case the difference between the load signal and the additional load data is too high.

The safety system may further be adapted to bring the wind turbine to a safe condition if the difference between the load signal and the load data is above a pre-defined validation value. The pre-defined value may depend on the load sensing system in use. A number of pre-defined validation values may be used in the safety system so that e.g. a pre-defined validation value exists for each sensing system.

The pre-defined validation value may be variable, e.g. so that it depends on weather conditions and/or the time of the day.

Furthermore, validation of the load signal may be a model-based validation which is not limited to measurements of loads. Instead, the model-based validation may be based on weather data.

The at least one load sensing system may as an example comprise one of the following: electrical sensors, optical sensors, acoustic sensor, GPS based sensors, accelerometers, gyro sensors, and Teraherz based sensors. Thus, acceleration measurements may be performed by means of an accelerometer arranged within the hub section, on the nacelle, or on the main shaft. Bending measurements may be performed e.g. by an angle measurement device. The RPM measurements may conveniently be a performed on the main shaft of the turbine or on a rotatable part within the hub section, to measure the rotational speed of the rotor. Alternatively, it may be performed by an instrument, which is independent of access to the main shaft of the wind turbine.

The invention claimed is:

1. A safety system for a wind turbine, wherein the wind turbine includes a tower, a nacelle, and a rotor with blades, the safety system comprising:
   at least one load sensing system configured to provide a load signal significant for a load on the tower or rotor;
   a validation sensor configured to provide an additional load signal; and
   an electronic system that:
      brings the wind turbine to a safe condition upon the load signal exceeding a threshold value; and
      brings the wind turbine to a safe condition upon a difference between the load signal and the additional load signal exceeding a pre-defined validation value.

2. A safety system according to claim 1, wherein the safe condition comprises a condition where the wind turbine is brought to a standstill.

3. A safety system according to claim 1, wherein the safe condition comprises a condition where the wind turbine is brought to an idle mode.

4. A safety system according to claim 1, wherein the electronic system comprises load data describing a critical load condition and wherein bringing the wind turbine to a safe condition is based on a comparison between the provided load signal and the load data.

5. A safety system according to claim 1, wherein the electronic system receives load signals from the load sensing system while bringing the wind turbine to a safe condition.

6. A safety system according to claim 1, wherein the load signal is significant for torsion or bending of the tower or rotor.

7. A safety system according to claim 1, wherein the load sensing system is capable of detecting load caused by at least one of ice formation on the rotor, mass unbalance, de-lamination, lightning, and excessive rotor speed.

8. A safety system according to claim 1, wherein bringing the wind turbine to a safe condition is further based on weather conditions.

9. A safety system according to claim 1, wherein the at least one load sensing system is selected from a group consisting of: electrical sensors, optical sensors, acoustic sensor, GPS based sensors, accelerometers, gyro sensors, and Teraherz based sensors.

10. A safety system according to claim 1, wherein the load sensing system is positioned on at least one of the blades.

11. A safety system according to claim 1, wherein the load sensing system is a single-channel sensor with a probability of dangerous failure per hour (PFH) of at most $10^{-6}$, and a safe failure fraction above 90%.

12. A safety system according to claim 1, wherein the load sensing system is a dual-channel system with a probability of dangerous failure per hour (PFH) of at most $10^{-6}$, and a safe failure fraction above 60%.

13. A wind turbine, comprising:
   a tower;
   a nacelle disposed on the tower;
   a rotor with blades; and
   a safety system comprising:
      at least one load sensing system configured to provide a load signal significant for a load on the tower or rotor;
      a validation sensor configured to provide an additional load signal; and
      an electronic system that:
         brings the wind turbine to a safe condition upon the load signal exceeding a threshold signal; and
         brings the wind turbine to a safe condition upon a difference between the load signal and the additional load signal exceeding a pre-defined validation value.

14. The wind turbine according to claim 13, wherein the safe condition comprises a condition where the wind turbine is brought to a standstill.

15. The wind turbine according to claim 13, wherein the safe condition comprises a condition where the wind turbine is brought to an idle mode.

16. The wind turbine according to claim 13, wherein the electronic system comprises load data describing a critical load condition, and wherein the threshold signal is based on the critical load condition.

17. The wind turbine of claim 13, wherein the electronic system receives load signals from the load sensing system while bringing the wind turbine to a safe condition.

18. The wind turbine of claim 13, wherein the load signal is significant for at least one of torsion and bending of at least one of the tower and the rotor.

19. The wind turbine of claim 13, wherein the load sensing system is configured to detect loads caused by at least one of ice formation on the rotor, mass unbalance, de-lamination, lightning, and excessive rotor speed.

20. The wind turbine of claim 13, wherein the at least one load sensing system is selected from a group consisting of: electrical sensors, optical sensors, acoustic sensors, GPS-based sensors, accelerometers, gyro sensors, and Teraherz-based sensors.

* * * * *